Figure 1:
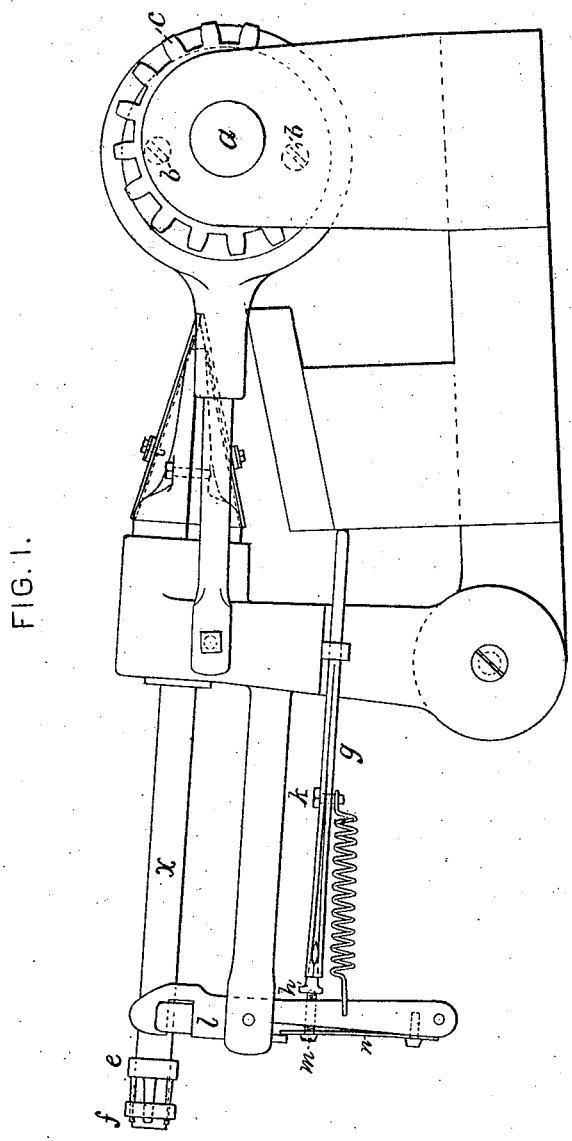

2 Sheets—Sheet 1.

J. C. GOULD.
NAIL-PLATE FEEDERS.

No. 185,317.　　　　　　　　Patented Dec. 12, 1876.

WITNESSES:　　　　　　　　　J. C. Gould,
Walter Pell　　　　　　　　　　INVENTOR.

THE GRAPHIC CO. N.Y.

2 Sheets—Sheet 2.
J. C. GOULD.
NAIL-PLATE FEEDERS.
No. 185,317. Patented Dec. 12, 1876.

FIG. 8.

FIG. 9. FIG. 10.  FIG. 11 
WITNESSES:
Walter Pell
Wm Kemble Hall
J. C. Gould,
INVENTOR.
THE GRAPHIC CO. N.Y.

UNITED STATES PATENT OFFICE.

JOHN C. GOULD, OF FRENCHTOWN, NEW JERSEY.

IMPROVEMENT IN NAIL-PLATE FEEDERS.

Specification forming part of Letters Patent No. 185,317, dated December 12, 1876; application filed May 22, 1876.

*To all whom it may concern:*

Be it known that I, JOHN C. GOULD, of Frenchtown, in the State of New Jersey, have invented certain new and useful Improvements in Nail-Plate Feeders, of which the following is a specification:

The said improvements relate to the automatic feeders for nail-making machines, in which the forks that gripe the nipper-rod, that feeds the plate through the nose-piece of the barrel to the knives that cut the nails, are worked by a push-rod, that strikes the frame of the machine as the feeder is worked to and fro.

The object of the said improvements is to facilitate the adjustment of the feeder; and they relate to the several parts shown in the drawings, in which—

Figure 1 is a side elevation, showing them together; and the other figures show them separately and in detail.

Figure 2:
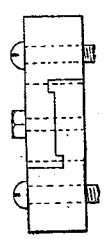
Figure 3:
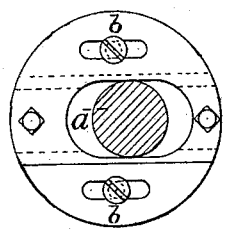
Figure 4:
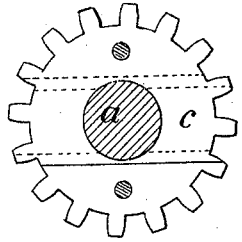
Figure 5:

The eccentric, Figs. 2 and 3, by which the feeder is worked is not bolted or keyed on the shaft $a$, but is made with an oblong hole for the shaft, and with slots on opposite sides for the tap-bolts $b$, by which it is secured to the pinion $c$ on the shaft. The eccentric is held in any position by the bolts, and its throw may be adjusted in extent by moving it backward or forward, and its "lead," or the relative time of its action, may be adjusted by moving it around on the shaft, the adjustment in both cases being limited by the slots. As the eccentric and the wheel to which it is bolted, Figs. 4 and 5, are both usually placed between the frames of the machine, it is convenient to make them in halves, which may be bolted together on the shaft in the manner shown in the drawing.

Figure 6:
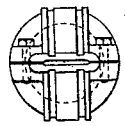
Figure 7:
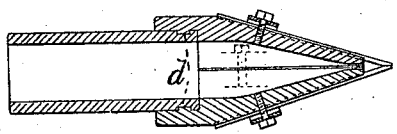

Figs. 6 and 7 are, respectively, an end view and a longitudinal section of the nose-piece and barrel through which the nail-plate is fed to the cutting dies or knives. The barrel is made with a groove, $d$, into which is fitted a tongue on the inside of the nose-piece, which is made in halves, that are bolted together. By slackening the bolts the nose-piece may be turned to adjust it; and it may be easily changed for different sizes of nails without changing the barrel.

Fig. 8 represents the parts of a new stop-ring, that is fitted upon the nipper-rod. In the ordinary stop, which is required to stop the feeding of the plate when it is cut down to a sufficiently small "butt," the key or set-screw that has been hitherto used has dented the surface of the rod, and interfered with the gripe of the tongs or forks when it became necessary, in changing the machine, to have that part of the rod pass between the forks. The stop represented in Fig. 8 consists of a ring, $e$, that is fitted with prongs and slipped over the nipper-rod, and jammed or clamped upon the rod by driving the ring $f$ upon the prongs. The feeding force continues to act a little longer than is necessary to carry the plate against the gage, and the push-up rod $g$, after feeding the plate between the cutting-knives and against the gage set for it, usually continues to push up the plate. When the surplus force is taken up by the ordinary spring the resiliency of the spring by which the feeding force continues to exert itself is equal to the full amount of the pressure required in the first place to compress the spring.

By making the push-rod in the manner shown in Figs. 9, 10, and 11, the wedge $h$ is pressed in between the spring parts of the rod $g$ at $i$, and the reaction to force it out is necessarily much less than that required to force it in, and the force with which the push-up rod is shortened is so much diminished that it is effectually restrained by the springs on the nose-piece, so that the plate is not fed through the barrel until the proper time. The tension of the spring sides of the rod upon the wedge may be adjusted by the bolt $k$, so that the mere turning of that bolt may regulate the force with which the feed is effected.

Figure 12:
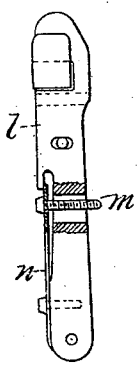
Figure 13:
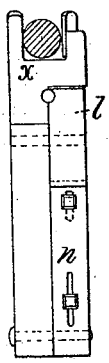

Figs. 12 and 13 are side and end elevations of the forks, which are constructed to slip loosely on the nipper-rod $x$ when their upper ends are moved back from the machine, and to gripe it tightly when the upper ends are moved forward and the fork $l$ is pressed by the push-rod $g$. If the bolt $m$ be moved up, the pressure of the gripe is increased, but the motion is less; and if the bolt be moved down, the motion is increased, but the pressure is lessened. By mounting the bolt $m$ on a spring, $n$, which is held by a bolt in a slot, the position of the bolt $m$ may be easily adjusted, and the elasticity of the spring $n$ takes up the surplus motion of the feed.

I claim as my invention—

1. The nose-pieces and barrels, Figs. 6 and and 7, fitted with a tongue and groove, $d$, in the manner described.

2. The pair of rings $e$ and $f$, made and combined substantially as described, for a stop to the nipper-rod.

3. The combination of the wedge $h$ and the spring push-rod $g$, for the purpose described.

4. The adjustable bolt $m$, in combination with the forks $l$, and either with or without the spring $n$.

J. C. GOULD.

Witnesses:
  WALTER PELL,
  WM. KEMBLE HALL.